US00RE50879E

(19) United States
(12) Reissued Patent
Thomasset et al.

(10) Patent Number: US RE50,879 E
(45) Date of Reissued Patent: May 5, 2026

(54) METHOD FOR EXTRUDING AND LABELLING A CYLINDRICAL PRODUCT

(71) Applicant: AISAPACK HOLDING SA, Vouvry (CH)

(72) Inventors: Jacques Thomasset, Neuvecelle (FR); Eduardo Rey, Vouvry (CH)

(73) Assignee: AISAPACK HOLDING SA, Vouvry (CH)

(21) Appl. No.: 18/658,719

(22) Filed: May 8, 2024

Related U.S. Patent Documents

Reissue of:
(64) Patent No.: 11,548,197
Issued: Jan. 10, 2023
Appl. No.: 16/332,671
PCT Filed: Sep. 13, 2017
PCT No.: PCT/IB2017/055515
§ 371 (c)(1),
(2) Date: Mar. 12, 2019
PCT Pub. No.: WO2018/051235
PCT Pub. Date: Mar. 22, 2018

(30) Foreign Application Priority Data

Sep. 13, 2016 (EP) ..... 16188491

(51) Int. Cl.
*B29C 48/00* (2019.01)
*B29C 48/09* (2019.01)
(Continued)

(52) U.S. Cl.
CPC ..... *B29C 48/0021* (2019.02); *B29C 48/0023* (2019.02); *B29C 48/09* (2019.02); *B29C 48/141* (2019.02); *B29C 48/901* (2019.02)

(58) Field of Classification Search
CPC . B29C 48/901; B29C 48/0021; B29C 48/152; B29C 48/141; B29C 48/0023;
(Continued)

(56) References Cited

U.S. PATENT DOCUMENTS 2,377,908 A * 6/1945 Slaughter ..... B29C 48/908 264/484
3,494,812 A 2/1970 Cvacho
(Continued)

FOREIGN PATENT DOCUMENTS

CN 1196697 10/1998
CN 1196697 A 10/1998
(Continued)

OTHER PUBLICATIONS

Written Opinion of the International Searching Authority dated Jan. 17, 2018, issued in International Application No. PCT/IB2017/055515, 7 pages.
(Continued)

*Primary Examiner* — Elizabeth L Mckane
(74) *Attorney, Agent, or Firm* — Nixon & Vanderhye, PC

(57) ABSTRACT

The method for extruding and labeling a packaging tube comprises the following successive steps:

a) forming a partially or totally tubular label from a film in a shaper; b) inserting the label into a calibration element; c) extruding a tubular body at the concave-face side of the label in an extrusion head; d) bringing the outer face of the extruded tubular body into contact with the concave face of the label. In the method, the label comprises at least one layer of which the melting temperature is at least 20° C. higher than the melting temperature of the extruded tubular body. A first pressure difference is formed in the extruded tube with an air jet.

17 Claims, 5 Drawing Sheets

(51) Int. Cl.
*B29C 48/14* (2019.01)
*B29C 48/90* (2019.01)

(58) Field of Classification Search
CPC ..... B29C 48/279; B29C 48/09; B29C 48/278; B29C 63/065; Y02P 70/10
See application file for complete search history.

(56) References Cited

U.S. PATENT DOCUMENTS

| | | | | |
|---|---|---|---|---|
| 3,767,496 | A | 10/1973 | Amberg et al. | |
| 3,981,669 | A * | 9/1976 | Gambill | B29C 31/08 425/397 |
| 4,088,724 | A | 5/1978 | Kuhnert | |
| 4,261,777 | A | 4/1981 | Vetter et al. | |
| 4,278,738 | A * | 7/1981 | Brax | B32B 27/08 428/515 |
| 4,581,262 | A | 4/1986 | Karabedian | |
| 4,724,027 | A | 2/1988 | Piltz et al. | |
| 4,883,697 | A | 11/1989 | Dornbusch et al. | |
| 6,053,214 | A * | 4/2000 | Sjoberg | B29C 48/33 138/134 |
| 2002/0084283 | A1 | 7/2002 | Giblin et al. | |
| 2007/0151665 | A1 | 7/2007 | Wiegand et al. | |
| 2008/0116213 | A1* | 5/2008 | Schlaupitz | B29C 48/10 220/694 |
| 2010/0193125 | A1 | 8/2010 | Thomasset | |
| 2010/0272936 | A1 | 10/2010 | White et al. | |
| 2013/0206325 | A1 | 8/2013 | Giuliani et al. | |
| 2017/0232650 | A1* | 8/2017 | Zhou | B29D 11/00663 425/552 |

FOREIGN PATENT DOCUMENTS

| | | | |
|---|---|---|---|
| CN | 204640760 | | 9/2015 |
| DE | 1 504 918 | | 10/1969 |
| DE | 39 20 854 | | 1/1991 |
| DE | 10 2006 006 993 | | 8/2007 |
| EP | 0 182 763 | | 5/1986 |
| EP | 0 457 561 | | 11/1991 |
| EP | 0 823 873 | | 8/1999 |
| FR | 1311341 | | 12/1962 |
| FR | 1311341 | A | 12/1962 |
| GB | 1298634 | * | 12/1972 |
| JP | S57-103822 | | 6/1982 |
| JP | S57-103822 | A | 6/1982 |
| JP | S57-109622 | | 7/1982 |
| JP | S57-109622 | A | 7/1982 |
| JP | 2001-226476 | | 8/2001 |
| JP | 2001-538870 | A | 12/2010 |
| JP | 2010-538870 | | 12/2010 |
| RU | 2505411 | | 1/2014 |
| RU | 2505411 | C2 | 1/2014 |
| SU | 1071215 | | 1/1984 |
| SU | 1071215 | A | 1/1984 |
| WO | 2007/082652 | | 7/2007 |
| WO | 2007/092652 | | 8/2007 |
| WO | 2009/049374 | | 4/2009 |
| WO | 2015/159234 | | 10/2015 |

OTHER PUBLICATIONS

English translation of Notice of Preliminary Rejection dated Mar. 10, 2021, issued in Korea Application No. 10-2019-7010571, 15 pages.

International Search Report for PCT/IB2017/055515 dated Jan. 17, 2018, 8 pages.

First Office Action dated Jul. 3, 2020, issued in China Application No. 201780055887.6 and English translation, 25 pages.

* cited by examiner

METHOD FOR EXTRUDING AND LABELLING A CYLINDRICAL PRODUCT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application is a United States national stage application of International patent application PCT/IB2017/055515 filed on Sep. 13, 2017 that is designating the United States, and claims foreign priority to European patent application EP 16188491.1 filed on Sep. 13, 2016, the contents of both documents being herewith incorporated by reference in their entirety.

TECHNICAL FIELD AND PRIOR ART

The invention is situated in the field of tubes or cylinders, and more particularly in the field of packaging tubes for liquid or viscous products, such as toothpastes and creams, the skirt of which is obtained by extrusion of material.

Flexible packaging tubes generally have two distinct parts, namely a flexible cylindrical body or skirt connected to a head including a neck that is closed by a cap. The skirt of the tube is obtained either by extrusion of a tubular body or by welding of a multilayer film that is rolled up to form this tubular body before welding it edge to edge or with an overlap.

A number of methods exist for adding and fixing a tube head to the end of a previously extruded skirt. The tube head may be compression or injection molded and conjointly welded to the skirt by an overmolding process. Another method consists in prefabricating the tube head by injection or compression molding and then assembling the tube head to the skirt by welding.

The tube formed in this way is then decorated at the level of the skirt, notably by the end user of the tube, and printing techniques are routinely used to add the required decoration. When the skirt is obtained by extrusion of a tubular body, the printing operation is carried out before or after the assembly of the skirt and the tube head. This printing operation has a number of disadvantages linked to the fact that the printing is not carried out flat but on the tubular geometry of the skirt. This generally leads to a process of greater complexity and consequently costly equipment, lower production rates, and reduced flexibility of the manufacturing process. The lack of flexibility of printing machines leads for example to reworking operations for complex decorations such as screenprinting or a hot decoration process.

In order to overcome the difficulties of decoration by printing, one alternative method consists in applying a preprinted adhesive label to the tube. The label, which is associated with a support film generally made of PET, is separated from the support upon application to the external surface of the tube. The label is precoated with a sticky adhesive that bonds the label to the surface of the tube. The adhesive layer is protected by the support film before application of the label to the tube.

For example, the method disclosed in the patent application WO 2007/092652 consists in applying a thin label that is not suck to a support film before use. In this method, the operation of coating or of activation of the adhesive layer takes place at the moment of application of the label to the surface of the tube. A variant of this method consists in applying the adhesive layer to the label at the moment of application. Another variant consists in applying the adhesive layer to the surface of the tube before application of the label. The method described in WO 2007/082652 has a number of disadvantages, however. The addition of an adhesive layer by coating at the moment of application of the label or the addition of an activation step makes the manufacturing process more complex, in particular when applied on a line for continuous tube extrusion (FIG. 2 of WO 2007/092652). Another disadvantage lies in the very short activation time of the adhesive layer that this method requires, which can lead to a restricted and costly choice of adhesives. Another disadvantage is situated at the level of the packaging: the label that is added to the surface of the tube is not an integral part of the wall of the packaging. The edges of the label are sometimes visible or detectable by touch and compromise the decorative and esthetic properties of the packaging.

The patent application EP 0 457 561 describes a method and a device for the making up of extruded tubular bodies having a laminated surface film. This method consists in forming a first tubular body from a film, extruding a liner inside said tubular body, drawing the liner radially, pressing the liner against the tubular body. This method has a number of disadvantages. A first disadvantage is linked to the fact that the liner must be extruded inside the tubular body formed by the film. This operation requires a tube diameter sufficiently large to place in the tube the tools necessary for the extrusion and radial drawing of the extruded liner. The method proposed in this prior art does not enable the production of tubes of small diameter and in particular of tubes with a diameter less than 35 mm. EP 0 457 561 also proposes internal calibration of the diameter of the tube. Apart from the issues of bulk cited above, this method has the disadvantage of generating small variations of the outside diameter of the tube. These variations, which depend on the regularity of the throughput of the extruder, can generate decoration defects. Indeed, to obtain decoration of high quality, the edges of the decorative film on the external surface of the tubular body must be butt jointed. Now, the extrusion rate variations cited above have the effect of varying the outside diameter of the tubular body, and thus of moving the edges of the decorative film closer together or farther apart. These variations generate visual defects at the level of the junction of the edges of the decorative film.

Similar disadvantages are found in the methods and devices described in the patent applications DE 1 504 918 and DE 10 2006 006 993 for example.

U.S. Pat. No. 4,261,777 describes a method and a device for the production of a hollow synthetic structural section at least one side of which is covered by a single-layer film, the side of the structural section covered by the film having a plane surface. The film can be of paper or metal or again a synthetic material.

In the device, a film is therefore applied to the plane surface of the structural section, and vacuum is preferably applied to the formed structural section with atmospheric pressure maintained in the structural section to press it against the film. The profiles produced are not cylindrical but rectangular and include said single-layer film on at least one plane face. The film therefore does not need to be conformed in any particular manner, and it suffices to unroll it and to apply it to the provided plane surface. If it is wished to apply a film to two plane surfaces of the structural section, then two films are unrolled and individually applied to the surface of the structural section.

The application EP 0 182 763 describes a method and a system for the production of an extrudable material tube surrounded by a metal film. In the method described, the tube is formed first, after which it enters a module in which it is surrounded by the metal film. Said film comprises an adhesive layer and the tube-film assembly is laminated to produce the final product.

The application JP 2001 226476 describes products formed of polyester compositions.

The application DE 39 20 854 describes extruded plastic profiles, in particular surfaces of window or door frames with wood decorative finishes. The extruded structural section is joined to a film and to a particular wood grain. The structural section has a "T" shape and the surfaces to which the film is applied are plane. In the production machine, a film is applied to the required plane surfaces once the structural section has been extruded and the structural section-film assembly is then calibrated and cooled to form the end product. As the surfaces to which the film is applied are plane, it is not necessary to shape the film, it suffices to unroll it and to apply it to the intended surface.

The international application WO 2015/159234 in the name of AISAPACK HOLDING SA describes a method and a device for extruding and labeling a packaging tube obtained by extrusion, this publication being incorporated by reference in its entirety into the present application.

The method described in the above publication enables the decoration of skirts of extruded tubes thanks to an economical and flexible method. It consists in associating extrusion operations with labeling operations in order to end up with a decorated tubular body. The label is formed by a decorative film comprising at least two layers. The decorative film is integrated into the packaging during extrusion of the tubular body in the molten state, so that the exterior surface of the decorated packaging forms a continuous surface with no sharp edges. Thanks to the method from the above publication the decorative film forms an integral part of the packaging in contrast to a label of the usual kind added to packaging already formed.

In WO 2015/159234, the decorative film that forms all or part of the external surface of the tubular body is preferably welded to the tubular body thanks to the heat of the extruded resin. In one embodiment, the decorative film comes into contact with the molten extrudate before the cooling phase, before the calibration step.

The method according to WO 2015/159234 is the result of combining an extrusion process and a labeling process. The method consists in bringing the label into contact around the tubular body in the molten state, preferably after the operation of shaping the film into a tubular geometry. The resulting multilayer tubular structure is advantageously calibrated and cooled in order to obtain a decorated extruded tube.

In one embodiment from WO 2015/159234, the method includes a first step of shaping the film into a partially or totally tubular geometry, followed by a second step of extrusion of a tubular body in the molten state; thereafter a third step consists in bringing the external surface of the tubular body in the molten state into contact against the (concave) internal surface of the label and finally a calibration fourth step consisting in applying the external surface of the label intended to form the external surface of the tube against the internal surface of the calibration element. The third step is performed by means of a pressure difference between the internal and external surfaces of the tubular body. The fourth step employs a pressure difference between the internal surface and the external surface of the tube.

The method according to WO 2015/159234 therefore consists in producing an extruded tubular body having a decorative film label that may compose all of its external surface. Thus the tubular body is completely enveloped in the label when it enters the calibration element and the successive cooling tanks. The molten material does not rub on the cooled tools, which enables improvement of the esthetics of the packaging produced and its resistance to impact and to stress cracks.

In WO 2015/159234, a first pressure difference is used to bring the tubular body and the label into contact. This first pressure difference is exerted at least between the extrudate outlet of the nozzle of the tool and the zone of contact between the internal surface of the film and the external surface of the extrudate. This first pressure difference makes it possible to prevent air bubbles from being trapped between the label and the external surface of the tubular body. In one embodiment of the invention, the pressure difference is created by a positive air pressure inside the tube. An alternative way to create this pressure difference consists in creating a reduced pressure chamber between the extruder and the calibration element. In one embodiment, the tubular body and the label are brought into contact immediately after shaping the tube into a tubular geometry.

In a variant of the method the film is shaped into a tubular geometry conjointly with the inflation of the tubular body onto the internal surface of the film. In this variant, the plane of contact (the plane formed by the contact zone) between the film and the tubular body is inclined relative to the axis of the tube in contrast to the prior art in which the contact plane is always perpendicular to the axis of the tube.

A second pressure difference is advantageously employed to press the external surface of the tube against the internal surface of the calibration element and to prevent shrinkage of the tube during cooling. This so-called calibration step enables accurate adjustment of the outside diameter of the tube. In the method according to WO 2015/159234, the external surface of the tube is formed by the label that comes to slide on the internal surface of the calibration element. The tube is then cooled, cut, using the usual methods.

Nevertheless, it has proven that improvements to the known methods could be employed to enhance the quality of the products obtained and to reduce production defects.

Definitions

In the present text the term "labeling" refers to fixing a film, said film also being denoted a "decorative film" or "label", onto a tube. The term "decoration" refers to an information and/or esthetic and/or safety visual element (such as a marking) notably present on the film.

The term "tubular body" is used to designate the extruded material in the molten state that is pressed against the decorative film.

The term "tube" is used to designate the product formed by the decorative film and the extruded material. The term "tube" applies from the moment at which the extruded body is pressed against the decorative film.

SUMMARY OF THE INVENTION

One object of the invention is therefore to improve the methods of producing tubes including a label.

Another object of the invention is to propose a method of producing tubes by extrusion inside a label of tubular shape that is improved compared to that known from WO 2015/159234 and to the products obtained with this prior art method.

The theory of the method according to the present invention is similar to that described in the publication WO 2015/159234 which is incorporated by reference into the present application, to which method important modifications have been made as described hereinafter.

In one embodiment, the invention concerns a method of extruding and labeling a packaging tube comprising the following successive steps carried out on an extrusion-labeling line:

a) formation of a partially or totally tubular label from a film in a shaper;

b) introduction of the label into a calibration element;

c) extrusion of a tubular body on the side of the concave face of the label in an extrusion head;

d) bringing the external face of the extruded tubular body into contact with the concave face of the label, in which method the label comprises at least one layer the melting point of which is at least 20° C. higher than the melting point of the extruded tubular body.

In one embodiment, the step d) is carried out by means of a jet of air.

In one embodiment, the step d) is also carried out by means of a first pressure difference (ΔP1) that is created between the interior and the exterior of the tubular body. Assuming that the exterior of the tubular body is at atmospheric pressure, this first pressure difference is created by a raised pressure in the tubular body, i.e. by the formation of a pressure higher than atmospheric pressure in the tubular body.

In one embodiment the first pressure difference (ΔP1) is generated by a first plug situated downstream of the shaper that at least partially obstructs the escape of air via the interior of the tubular body.

In one embodiment, the first pressure difference is also generated by a controlled escape of air from the upstream side of the shaper, via the extrusion head.

In one embodiment, the plug is retained inside the tube by magnetic forces.

In one embodiment, the first plug is situated after means for pulling on the tube.

In one embodiment, a second plug is connected to the extrusion head during the starting phase.

In one embodiment, after the starting phase the second plug is released from the extrusion head and transported by the moving tube until it comes to abut against the first plug or against some other appropriate means.

The first pressure difference (ΔP1) therefore facilitates pulling of the tube by the pulling means.

In one embodiment, a second pressure difference ΔP2 is established between the interior and the exterior of the tube.

In one embodiment, the second pressure difference ΔP2 is created by a reduced pressure in a vacuum tank, i.e. by establishing an outside pressure lower than that in the tube.

The conjoint use of a first pressure difference (ΔP1) at the level of the tubular body and a second pressure difference (ΔP2) at the level of the tube enables reduction of the variations in diameter of the tube. Indeed, in one preferred embodiment of the invention, the pressure inside the tubular body (higher than atmospheric pressure) and the pressure outside the tube (lower than atmospheric pressure) are controlled throughout the process of manufacturing the tube. Controlling the internal raised pressure and the external lowered pressure makes it possible to circumvent variations in atmospheric pressure during production and consequently to guarantee very small variations of diameter of the tubes produced. In conventional extrusion devices, only the pressure outside the tube or inside the tube is controlled, which makes the method dependent on variations in atmospheric pressure. To prevent variations in tube diameter, there are added to conventional extrusion devices pressure regulation systems based on continuous measurement of the diameter of the tube. The invention makes it possible to do away with these costly regulation devices by directly adjusting the value of the pressure inside and outside the tube.

The tubes obtained using the method according to the invention are very accurate. In particular, the diameter of the tube is very accurate. The variations in the diameter of the tubes during production have been measured and very small variations in diameter have been observed. Numerically, these small variations represent a standard deviation less than 5 hundredths of a millimeter and preferably less than 2 hundredths of a millimeter.

In one embodiment, the step c) is carried out in the calibration element.

In one embodiment, the calibration element is cooled.

In one embodiment, the calibration element includes a contact surface that enables reduction of friction with the label.

In one embodiment, the rubbing surface between the calibration element and the label is not lubricated or at least partially lubricated or it is textured.

In one embodiment, the rubbing surface of the calibration element is lubricated at least by the cooling water.

In one embodiment, the water used for lubrication and for cooling is at least partially demineralized.

In one embodiment, the water used for lubrication and for cooling is water obtained by osmosis.

In one embodiment, the tension of the label at the entry of the shaper is regulated.

In one embodiment, the tube undergoes a treatment to optimize its roundness. The treatment may for example be a heat or other treatment.

In one embodiment, the edges of the label are for example disposed end to end.

In one embodiment, the ends of the label for example form an overlap.

In one embodiment, the invention concerns a device for executing a method as described in the present application, the device comprising at least one device for formation of a partially or totally tubular label from a film, an extrusion device comprising an extrusion nozzle for the formation of a tubular body, on the side of the concave face of the label, a calibration element;

the extrusion nozzle being disposed inside the calibration element;

said device comprising at least one blower means creating a jet of compressed air in the extruded tubular body to bring said extruded tubular body into contact against the concave face of the shaped label, the device further comprising a first plug that at least partially blocks the escape of air via the interior of the tubular body formed, the plug being maintained fixed in position in the device despite the longitudinal movement of the tubular body formed in the device.

In one embodiment, the device comprises a magnetic bush that immobilizes the first plug.

In one embodiment, the plug comprises magnetic means cooperating with the magnetic bush to immobilize the first plug.

In one embodiment, the device comprises a second so-called "starter plug" connected to the blower rod that at least partially blocks the escape of the compressed air and enables inflation of the extruded body during the starting step of the manufacturing process.

In one embodiment, the second plug comprises at least one fixed or retractable washer.

In one preferred embodiment, once the production process has started, the second plug is detached from the blower rod and is transported by the moving tube until it comes to abut against the first plug which for its part is retained in position throughout production.

In one embodiment, the first plug is a floating plug maintained at a fixed position in the machine by external means, said plug maintaining the pressure in the extruded tube.

In one embodiment, the first plug is a magnetic plug and the device comprises a magnetic bush that immobilizes the plug despite the movement of the tube.

In one embodiment, the first plug comprises at least one washer.

In one embodiment of the device, a first pressure difference ($\Delta P1$), i.e. a raised pressure, may be established between the interior and the exterior of the tubular body, and a second pressure difference ($\Delta P2$), i.e. a reduced pressure may be established between the interior and the exterior of the tube.

In one embodiment, the first pressure difference ($\Delta P1$) and the second pressure difference ($\Delta P2$) may be controlled throughout the manufacture of the tube in order to reduce variations in the diameter of the tube produced.

In one embodiment, the invention concerns a packaging tube obtained by a method as described in the present application.

The label is preferably thin compared to the thickness of the extruded tubular body.

In one embodiment, the tube formed of the label and the extruded body undergoes heat treatment to optimize its roundness.

The label preferably takes the form of a multilayer film with an internal layer and an external layer. When it is brought into contact with the extruded body in the molten state, the surface of the film or the internal layer forming the interface with the tubular body is heated to a temperature enabling said tubular body to be welded to the decorative film. In a preferred embodiment, all of the heat necessary for welding is provided by the tubular body. Because it is thin, the label is cooled on its (convex) external surface conjointly with the welding operation. The cooling is effected by contact of the external surface of the label on the internal surface of the calibration element or by contact with water. Cooling the label conjointly with the welding operation makes it possible to preserve the quality of the decoration and the surface properties of the label (gloss finish, matt finish, roughness, etc.).

The label is advantageously integrated into the thickness of the packaging and covers all of the exterior surface of the tubular body.

In one embodiment of the invention, the label forms only a part of the circumference of the tubular body, and its edges are trapped by the extruded resin so that the external surface of the tubular body forms a continuous surface.

The label may apply decoration to the packaging. It may equally apply surface properties modifying the "touch" of the packaging. In this regard, the invention enables surface treatment of the packaging with other materials impossible or difficult to extrude such as paper, textiles, "soft touch" resins, etc. These properties may be advantageous for markings or to form a safety element.

The label is advantageously used for its barrier properties. This embodiment avoids the use of a device for co-extrusion of the tubular body.

Another advantage of the invention is to facilitate the extrusion of grades of resins that are difficult to extrude because of generating "stick and slip" phenomena during calibration or of generating surface defects or again of generating breaks in the extrudate.

More generally, the invention may be used to enhance productivity because the molten material is no longer in direct contact with the surface of the calibration element. The rubbing of the molten material on the calibration element encountered in a conventional extrusion process is eliminated and so the production rate can be increased.

The packaging resulting from this manufacturing process offers very high cohesion between the label and the tubular body. The risks of the label becoming unstuck during the use of the packaging are avoided in contrast to prior art packaging produced with an adhesive label. Another advantage is linked to the absence of discontinuity on the surface of the tubular body, which makes it possible to prevent the discomforts linked to labels the edge surfaces of which can accumulate dust and degrade the esthetic properties.

The invention further enables production of decorated tubes of small or large diameter. It offers very great flexibility, and can be used in new installations or enables the modification of existing extrusion installations.

The invention also consists in an extrusion-labeling device as defined in the claims. The device produced in accordance with one preferred embodiment comprises means for extrusion of a tubular body in the molten state; a vacuum calibration and cooling tank; means for driving the cooled tube; cutting or rolling means and means for unrolling a film; a swan-neck shaper disposed between the extrusion head and the vacuum calibration tank; means for exerting a first pressure difference between the interior and the exterior of the extruded tubular body; means for exerting a second pressure difference between the interior and the exterior of the tube when it enters the vacuum calibration tank.

The label preferably passes through a swan-neck shaper disposed between the extrusion nozzle and the calibration element. Thanks to the swan-neck shaper, the label does not enter the extrusion tools, which prevents damage to the decorative film. In the present invention, the swan-neck shaper enables the extrusion tools to be extended into the interior of the tubular geometry formed by the film. The use of a swan-neck shaper is advantageous for a number of reasons. It prevents contact between the film and the hot tools, and by virtue of its compactness it enables reduction of the length of the tool referred to as the nozzle which is extended inside the swan-neck. The head losses and consequently the pressures generated by the flow of the molten material in the tooling are greatly reduced.

According to one variant of the invention, the swan-neck shaper, when associated with a pressure difference between the interior and the exterior of the tubular body, enables association of the tubular body with the decorative film in the swan-neck. An advantage of this procedure is the possibility of positioning the swan-neck shaper in the vicinity of the extrusion head in order to take up the tubular body as soon as it leaves the tools. The tubular body is deposited on the film, which slides on the swan-neck and conjointly drives the tubular body. The compactness of the swan-neck shaper is of great advantage. This shaper can easily be installed between the extrusion head and the calibration element.

Another variant of the invention consists in extruding a tubular body using a resin including expansion agents. The effect of these expansion agents is to produce inflation of the tubular body in the molten state and thus to bring the external face of the tubular body in the molten state into contact with the internal face or the internal layer of the film. According to this variant, bringing the external layer of the tubular body into contact with the internal layer or face of the film is preferably brought about by the expansion agents contained in the resin and not by a pressure difference. Similarly, the outside diameter is preferably calibrated by the action of the expansion agents, but may also result from a pressure difference between the internal surface of the tubular body and the external surface of the film, or by the combined action of the expansion agents and a pressure difference. This variant of the invention is particularly advantageous for reducing the weight of the packaging without having the disadvantage of an appearance degraded by the expansion agents. Indeed, the decorative film that forms the external surface of the packaging imparts the surface and decoration properties and the use of expansion agents enables reduction of the quantity of resin forming the extruded tubular body and forming the internal layer of the packaging.

The invention is not limited to the deposition of a film onto a tubular body in the molten state. Another variant of the invention consists in depositing the decorative film onto the external surface of a solid extruded body including expansion agents. For example the decorative film is deposited on the external surface of an extruded cylindrical body containing expansion agents. Expansion of the cylindrical body at the exit from the extrusion tools causes the internal layer of the film to be brought into contact with the external surface of the extruded body. Conjointly with this, or successively, the outside diameter of the decorated cylindrical body is adjusted thanks to passing the cylindrical body into a calibration element and a cooling tank. This variant of the invention is particularly advantageous for the production of packaging parts like synthetic caps used for glass bottles. One important market is the wine market. The optimization of this type of cap may necessitate different surface properties (slipperiness, seal, decoration) and core properties (contact with the wine, elasticity, compression, strength).

The decorative film may be deposited on extruded bodies of round, oval or square section or of more complex geometry.

BRIEF DESCRIPTION OF THE DRAWINGS

The invention will be better understood through the description of embodiments thereof with reference to the drawings in which.

DETAILED DESCRIPTION

Figure 1:
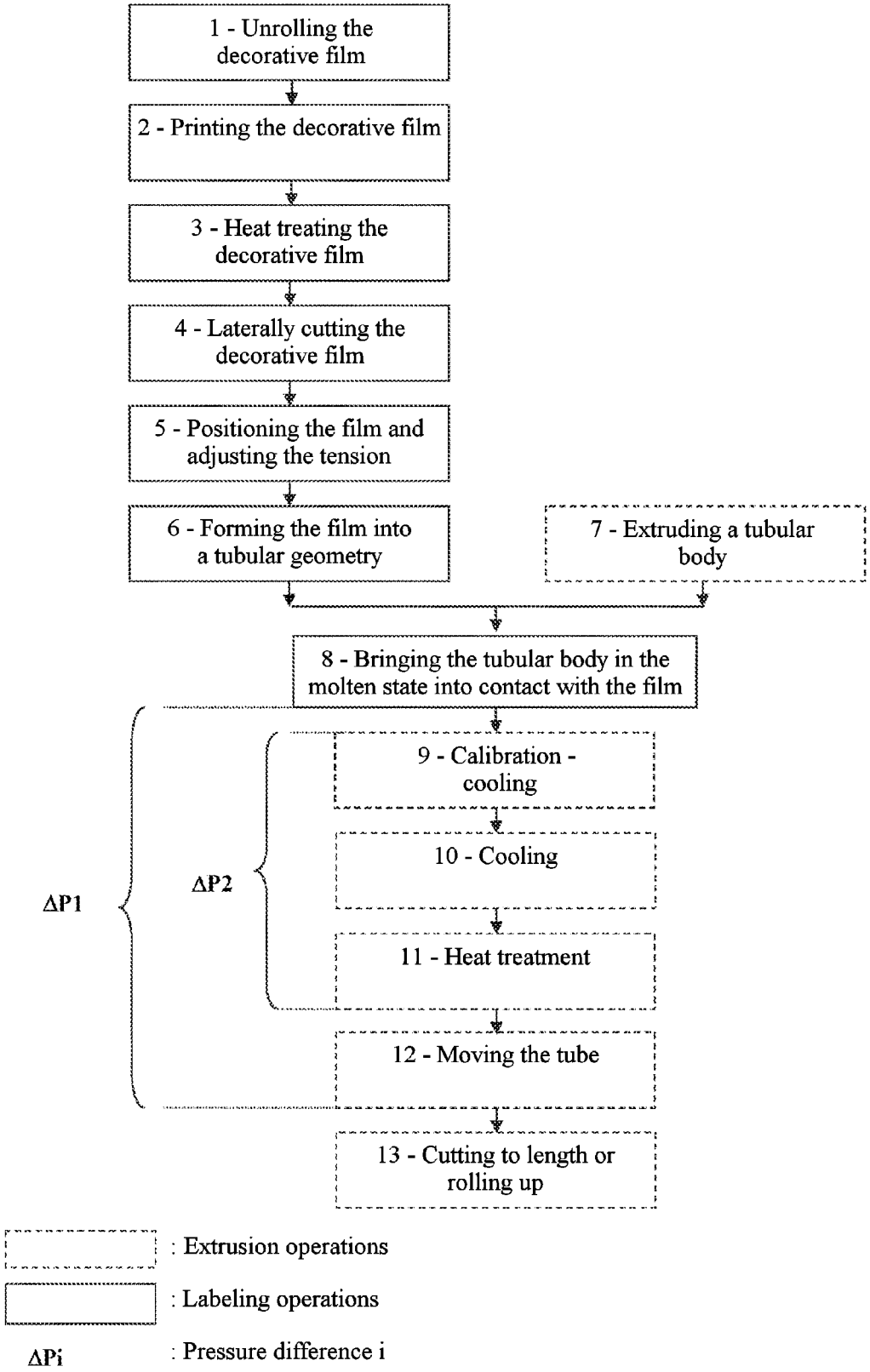
FIG. 1 is a block diagram of one embodiment of the method according to the invention.

FIG. 1 shows one embodiment of the method of the invention in the form of a block diagram representing the steps of the method.

In a first step (1), a decorative film (that will form the label) is unrolled from a spool, which is the usual method of producing decorative films of this kind for tubes of this kind.

In the method according to the invention, there follows the second step (2), which may be optional, in which is notably effected an operation of printing the decorative film. The decorative film can be printed using any of the known flat printing methods such as for example (nonlimiting): flexography, screenprinting, heliogravure, typographic printing, offset printing, hot stamping, cold foil, or again digital printing and combinations of these printing technologies. The invention will advantageously be associated with digital printing for productions necessitating flexibility and rapid changes of decoration. The printing may also be covered by a protective varnish.

In the method according to the invention, there follows a third step, which may be optional, in which a heat treatment of the decorative film is effected. This step notably consists in heating the film to a temperature generally between 60 and 160° C. inclusive. This temperature depends on the structure of the film used and the resins. A heat treatment temperature is preferably used lower than the melting point of the film. When the film is a multilayer film, it is generally the layer having the lowest thermal resistance that defines the treatment temperature. For example, for a PET/PE multilayer structure decorative film, a heat treatment temperature less than 120° C. is used. One example of a device for effecting the heat treatment causes the film to pass over a roller regulated to the heat treatment temperature. The unprinted face of the film is preferably brought into contact with the surface of the hot roller. A downstream second roller may be used to cool the film before the step (4). The heat treatment step (3) is optional and is used to relax any stresses that may be present in the film following the operations of printing and producing the decorative film. The heat treatment may also be used to reduce the friction of the film in the shaping tools (step 7) and calibration tools (steps 8 and 9). Indeed, the heat treatment may have the effect of improving the drying or the cross-linking of the printed layer.

In the unrolling process, there follows a fourth step (4), which may be optional, in which one or both lateral edges of the unrolled film is or are cut. This step enables precise adjustment of the dimensions of the film to those of the tube that will be produced, and for example to form at least one reference edge on the film, or again to remove one edge (or both edges) that could be spoiled and to circumvent this risk linked to the transportation and handling of the spools of film.

In the next step (5), the film is accurately positioned and its tension adjusted with a view to shaping it into its tubular geometry, which is the step (6) shown. The tension adjustment is a parameter that is important for obtaining the required tubular geometry without internal tensions in the decorative film 12 and therefore without subsequent deformation of the film shaped into its label geometry.

In parallel with this, in the step (7), a tubular body 13 is formed by extrusion inside the decorative film 12 that has been shaped with its tubular geometry.

According to the invention, the tubular body 13 is extruded directly into the film 12 which is in its tubular shape and the step (8) comprises bringing the external surface of the extruded body 13 into contact with the internal surface or the internal layer of the tubular shape film 12.

In the next step (9), the film 12 and the extruded tubular body 13 forming a tube 14 undergo a calibration operation in a calibration element 22 to fix the finished diameter of the product and a cooling operation in the calibration element 22.

In the next step (10), the shaped and calibrated tube 14 continues to undergo a cooling operation. During the step 10, it may be advantageous to add reshaping elements that have the effect of optimizing the roundness of the tube. These reshaping elements deform the tube during the cooling step, that is to say that the tubular body is cooled for a controlled time in a geometry that is not circular. This makes it possible to counter any effects on roundness of the discontinuity of the label when its edges are not joined.

In the optional step (11) the tube 14 undergoes heat treatment which has the effect of optimizing its roundness. The heat treatment is effected at a temperature that depends on the nature of the extruded resin. For a polyethylene extrusion, the temperature of the heat treatment is generally between 60 and 100° C. inclusive. The temperature of the treatment also depends on the thickness of the tube and the time of passage of the tube in the treatment device. This heat treatment is usually performed by passing the tube into a bath of hot water.

In the next step (12), the tube 14 is driven longitudinally and is finally cut to the required length (step (13)).

The steps (8) to (12) are effected using a pressure difference (a raised and/or lowered pressure) to shape the tube 14 into its final configuration as explained later in the present description.

Finally, once the above operations have been carried out, the shaped tube 14 is cut to the required length, or the shaped tube 14 is rolled up, depending on the subsequent operations to be carried out and the manner in which it is required to recover the shaped products (individual or non-individual tubes, in the form of a roll, etc.).

Figure 2:
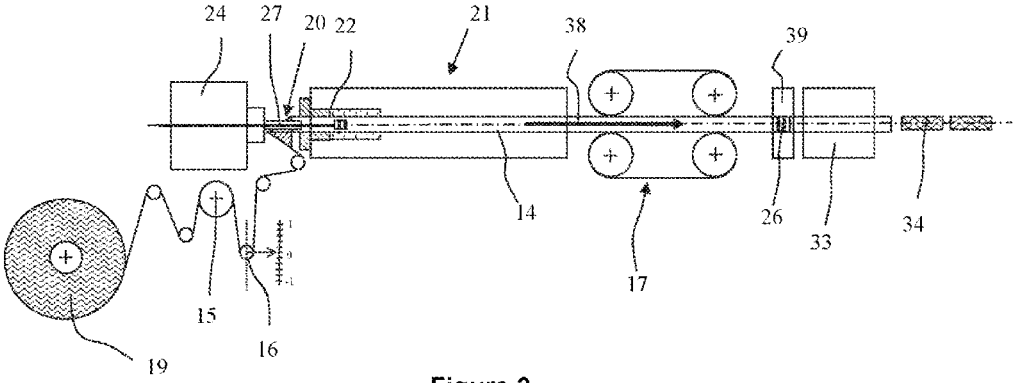
FIG. 2 is a diagrammatic side view of an extrusion machine in accordance with the present invention.

FIG. 2 shows a side view of a production machine according to the invention which enables execution of the method according to the present invention. The theory of the machine is similar to that described in the publication WO 2015/159234 incorporated by reference where the general characteristics of a machine of this kind and its operating principle are concerned.

The machine is fed, on the one hand, with a decorative film 12 that is for example rolled into the form of a spool 19 of film. Of course, the decorative film 12 may be supplied in some other appropriate form. The decorative film 12 passes over a series of rollers one of which is a drive roller 15 that enables active unrolling of the film with an optimum tension. There is also a tensioning arm 16 after the drive roller 15 that enables a constant tension to be maintained in the decorative film 12 before it enters the machine via the shaper (swan-neck 20). In order to reduce the forces on the decorative film, the tension of the film at the entry of the shaper is regulated. To be more precise, the rotation speed of the motor 15 is regulated by the position of the tensioning arm 16 situated between the drive roller 15 and the shaper 20. The mass of the tensioning arm 16 is adjusted as a function of the required tension in the decorative film 12.

These elements of the extrusion-labeling machine carry out the steps 1 to 6 of the method as described above and shown in FIG. 1.

At the entry of the machine there is also an extruder 23 with an extrusion head 24 and an extrusion nozzle 27 from which will exit the material used to make the tube by the method employed in the present invention in step 7 from FIG. 1.

In the cooling and vacuum tank 21 there is a calibration element 22 into which pass the decorative film 12 conformed to the tubular geometry and the extruded tube 13 inside said film in steps 8 and 9 of the method. The tube 14 is then cooled and moves in the direction 38 of movement. Outside the tank 21 it is driven by drive caterpillar tracks 17 or other equivalent means enabling the tube 14 produced to be advanced at the required speed.

The next station in the downstream direction of the machine comprises a magnetic bush 39 that is situated around the tube 14 and a first magnetic plug 26 that for its part is situated inside the tube 14. This plug 26 is used to maintain a pressure inside the tube 14 during the production thereof, as explained later in the description. To summarize, the plug 26 is retained fixed in position in the bush 39 by way of a magnetic force whilst the tube is moved in the downstream production direction of the machine. The reference 33 indicates a circumferential cutter that is used to cut individual tubes to the required size in the production cycle. Finally, the reference 34 indicates tubes produced with the decorative film 12 on their external surface that have been cut to the required length.

Figure 3:
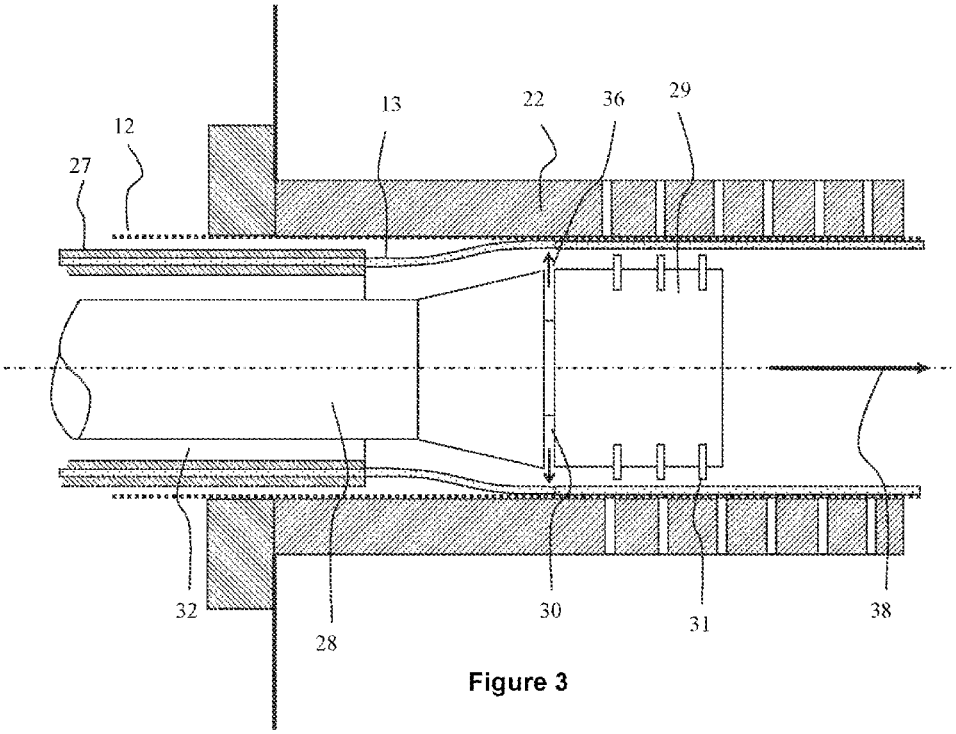
FIG. 3 shows a detail of one embodiment of the invention.

FIG. 3 shows construction details on the side of the extrusion nozzle 27 at the entry of the production machine. Starting from the left in this figure, there is shown the decorative film 12 that is shaped to the tubular geometry and introduced into the calibration element 22. The extrusion nozzle 27 is also introduced into the calibration element 22 and a tubular extruded body 13 is formed at the exit of the nozzle 27, inside the decorative film 12 shaped into the tubular geometry. Inside the nozzle 27 is a blower rod 28 enabling the creation of an air jet 36. This air jet brings into contact the external surface of the extruded tubular body 13 and the internal face of the decorative film 12. The intensity of the air jet is optimized by the air flow rate and the geometry of a blower slot 30. If the intensity of the air jet is insufficient, the contact between the extruded tubular body 13 and the decorative film 12 is irregular and small air bubbles are found to be trapped at the interface of the extruded body and the decorative film. These air bubbles degrade the final esthetics of the tube and are considered defects: they must therefore be prevented as much as possible. Consequently, to prevent such air bubbles the intensity of the jet of air is optimized primarily as a function of the rheology of the extruded body, the thickness of the wall of the extruded body and the linear speed of the labeling process.

The blower rod 28 comprises at least the blower slot 30 and a second plug 29 termed the starter plug. The washers 31 of the starter plug 29 reduce the passage section for air in the movement direction 38 and enable inflation of the extruded body during the starting step of the production process. The diameter of the washers 31 is slightly less than the inside diameter of the tubular body 13 to prevent contact of said washers with the material of said tubular body 13, still in the molten state. In an alternative embodiment, the starting plug 29 includes a device for shrinking the washers 31. On starting up, the washers 31 block the internal cavity of the tubular body 13 in order to inflate the extruded body. After starting up, the washers 31 are deformed, or shrunk or moved, in order to reduce their overall size in the radial direction and prevent contact thereof with the material of the tubular body 13 in the molten state.

Figure 4:
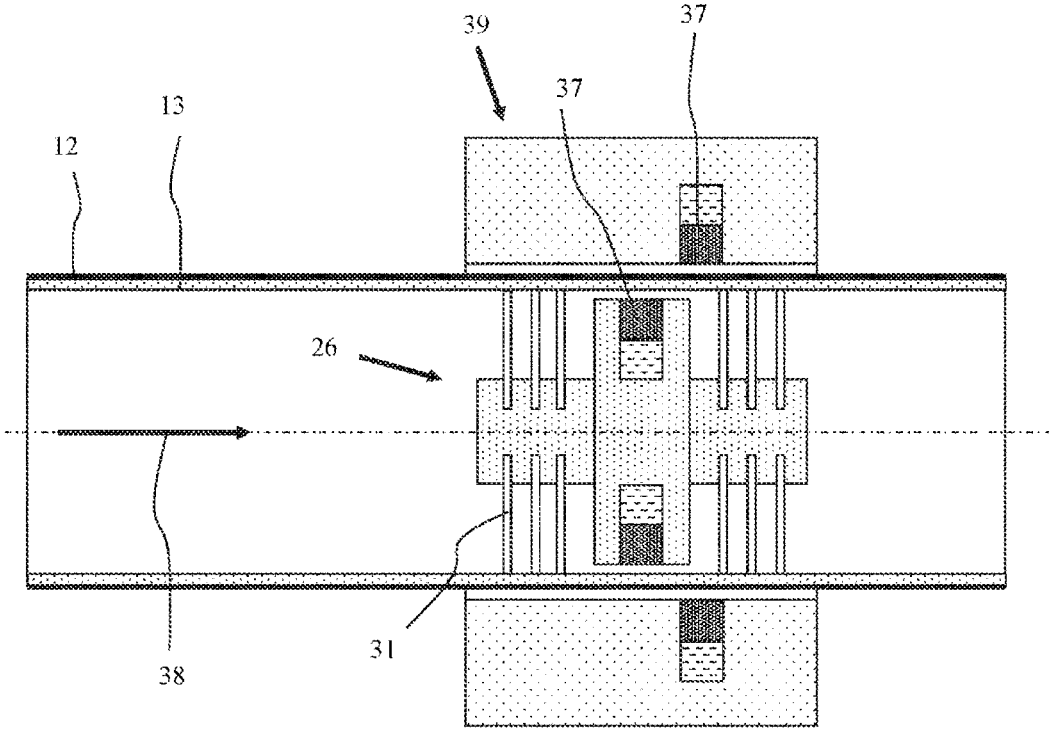
FIG. 4 shows another detail of one embodiment of the invention.
Figure 5:
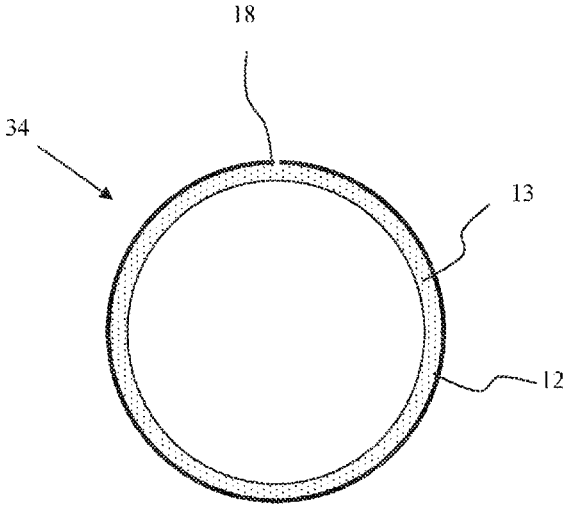
FIG. 5 shows in section a tube obtained using the invention.

In order to maintain a given pressure in the shaped tube downstream of the starter second plug 29, the magnetic first plug 26 is used in the manner shown in FIG. 4. This magnetic plug 26 is inserted inside the tubular body 13 the wall of which has solidified (see in FIG. 2 its position downstream of the machine).

The magnetic plug 26 is advantageously inserted inside the tubular body 13 after the cooling and vacuum tank 21. According to a preferred embodiment of the invention, the magnetic plug 26 is inserted in the tubular body after the drive caterpillar track 17 and before the circumferential cutter 33. Of course, other equivalent locations are possible.

The magnetic plug 26 includes at least one magnet and one washer, but preferably a plurality of magnets 37 and washers 31 that limit and/or prevent the escape of the compressed air present inside the tube in the extrusion direction. In a preferred embodiment, the magnetic plug 26 blocks the escape of air in the direction of movement of the tube 38. To this end, the magnetic plug 26 interacts with the magnetic bush 39, also including magnets 37, in order to remain in a stable and fixed position relative to the bush 39. In this preferred embodiment of the invention, the magnets 37 of the magnetic plug 26 and of the magnetic bush 39 are disposed so as to exert a force of repulsion between the magnetic plug 26 and the bush 39. The magnetic plug 26 and the magnetic bush 39 are optimized as a function of the necessary axial repulsion force. The magnetic plug 26 and the magnetic bush 39 may contain a number of rows of magnets 37 to increase the axial force. One variant of the invention consists in using electromagnets to retain the plug 26 in position in the bush 39, despite linear movement of the tube 14 produced.

The conjoint action of the jet of air 36 fed by the blower rod 28 and the magnetic plug 26 creates a first pressure difference ΔP1 between the interior and the exterior of the tubular body 13. This first pressure difference is established starting from the formation of the extruded body 13 (FIG. 3) and as far as the position of the magnetic plug 26 situated upstream of the circumferential cutter 33 (FIG. 4). According to the invention, the pressure difference ΔP1 is generated by the magnetic plug 26 situated downstream of the shaper that at least partially blocks the escape of air so as to maintain this pressure difference. This pressure difference is a raised pressure relative to the pressure outside the tubular body 13, which is preferably atmospheric pressure.

According to one preferred embodiment, the magnetic plug 26 totally blocks the tube and prevents the escape of air from the downstream side.

According to the invention, the pressure difference ΔP1 is also generated by a controlled escape of air from the upstream side of the shaper via the extrusion head. The flow of air fed by the blower rod 28 preferably escapes via the escape channel 32 situated between the extrusion nozzle 27 and the decorative film 12.

In a variant, the second plug 29 (starter plug) may be detached from the blower rod 28 once the starting operation has been effected in order not to risk having any influence over the extruded tube that is not yet in the hardened state (and thus stable). Thus once the production process has been started and the tube has been pressurized thanks to the first magnetic first plug 26, the second plug can be released and transported by the moving tube until it comes to abut against the first plug, which for its part is in position throughout the production cycle. This avoids the risk of creating defects in the extruded tube at the exit from the extrusion nozzle 27. The means for attaching and releasing the plug 29 may be of any type: magnetic, mechanical (such as a linkage), etc.

According to the invention, a second pressure difference ΔP2 is created in the cooling and vacuum tank 21 and this pressure difference results in a lowered pressure, i.e. the pressure outside the tube 14 is lower than the pressure inside the tube 14. This pressure difference ΔP2 is added to the pressure difference ΔP1. The pressure difference ΔP2 is applied in the calibration element 22 after the extruded body 13 has been brought into contact with the decorative film 12.

The calibration element 22 is cooled by water. In the preferred embodiment the calibration element 22 is plunged into a water bath in the tank 21, the temperature of the water being regulated. An alternative embodiment consists in cooling the calibration element 22 by spraying it. The reduction of friction between the decorative film 12 and the internal surface of the calibration element 22 is important for obtaining a stable process and avoiding deterioration of the printing. The use of "slippery" coatings on the surface of the calibration element 22 such as PTFE type coatings for example enables significant reduction of the friction forces. A complementary or alternative approach consists in also reducing the area of contact by using textured or sand-blasted contact surfaces on the internal surface of the calibration element. Lubrication also has an important role in reducing the friction forces in the calibration element 22. For example, demineralized water may advantageously be used to lubricate the interface at least partially. Other equivalent means may of course be envisaged. The calibration element 22 may have a conical geometry followed by a cylindrical geometry. The conical geometry is used to adjust the geometry of the tube upon shrinkage of the label because of the effect of heat. Other calibration element geometries creating an equivalent effect may be used.

The invention, namely the method and the machine, enables improvement of the roundness of the tubes 14 obtained by the extrusion-labeling method.

Figure 6:
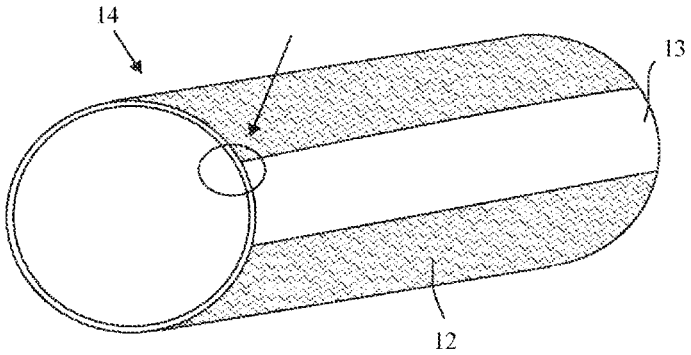
FIG. 6 shows a tube obtained using the method of the invention in which the edges of the decorative film are embedded in the tubular body.
Figure 7:
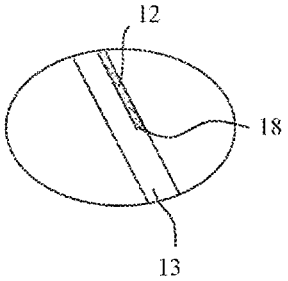
FIG. 7 shows a detail of FIG. 6.

The invention thus enables tubes as shown in FIG. 6 to be obtained.

The invention enables tubes to be obtained with a very accurate diameter thanks to the conjoint use of a first pressure difference (ΔP1) and a second pressure difference (ΔP2). According to the invention, in the case of the first pressure difference the pressure inside the tubular body 13 is preferably higher than atmospheric pressure and in the case of the second pressure difference the pressure outside the tube 14 is preferably lower than atmospheric pressure. The resulting pressure difference between the interior and the exterior of the tube is equal to the sum of (ΔP1) and (ΔP2).

Controlling the internal and external pressures makes it possible to ignore atmospheric pressure variations during production and consequently to guarantee very small variations in diameter of the tubes produced. For tubes of 35 mm diameter, there has been observed a very low variation in diameter corresponding to a standard deviation less than 0.02 mm. This result is not possible to obtain with a conventional extrusion device in which variations in diameter of the order of 0.1 mm may be produced that are caused by variations in atmospheric pressure. As indicated above, in conventional extrusion devices only the pressure outside the tube or inside the tube is controlled, which makes the process dependent on variations in atmospheric pressure. To prevent these diameter variations, there are added to the conventional extrusion devices pressure regulation systems based on continuous measurement of the diameter of the tube. The invention makes it possible to dispense with these costly regulation devices.

Thanks to the invention, the tubes obtained by the method are very accurate: in particular the diameter of the tube has variations of less than 0.05 mm and preferably less than 0.02 mm regardless of variations in atmospheric pressure.

One particular feature of the invention resides in the fact that the surface of the tube 14 rubbing on the calibration tools is the external surface of the decorative film 12, which is not in the molten state. This has the effect of facilitating the operation of calibrating the outside diameter of the tube. The tribological properties between the internal surface of the calibration element and the external surface of the tube are radically modified compared to a conventional extrusion operation. The method thus enables the use of new extruded materials or increased extrusion speeds.

FIG. 6 shows the tubes 14 obtained by the method. The decorative film 12 forms all or part of the external surface of the tube 14. The detail 7 shows the embedding of the edge 18 of the decorative film in the wall of the tubular body 13. The external surface of the tube 14 is continuous at the level of the edge of the decorative film 12. The thickness of the label 12 is small compared with the thickness of the tubular body 13.

Figure 8:
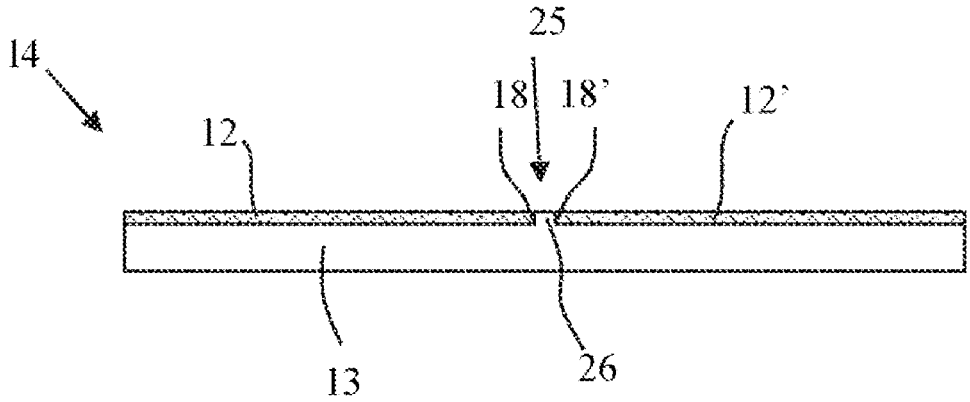
FIG. 8 is a part-sectional view of a tube comprising a decorative film on the surface the edges of which are disposed end to end. The edges are embedded in the tubular body.
Figure 9:
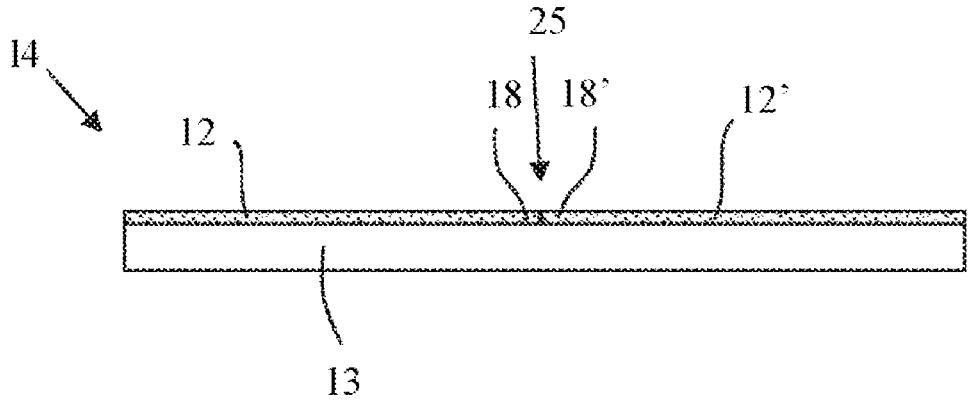
FIG. 9 shows a variant tube comprising a decorative film the edges of which are disposed end to end. According to this variant, the edges are in contact and the external surface of the tube forms a continuous smooth surface.

FIGS. 8 and 9 show an embodiment of the invention with a label over all the periphery of the tube.

FIG. 8 shows a first embodiment of a 360° decoration of the tube with the edges 18 and 18' of the label 12 disposed end to end and slightly spaced. The spacing of the edges of the label 12 may be linked to the accuracy of the lateral cutting of the label 12. Small gaps 25 between the edges 18 and 18' less than 100 microns and invisible to the naked eye are sometimes obtained. The gap 25 is filled by the resin forming the tubular body 13, thus creating a smooth external surface of the tube 14 without discontinuity at the level of the edges 18 and 18'.

FIG. 9 shows a second embodiment in which the edges 18 and 18' of the label 12 are disposed end to end and brought into contact. In this configuration, continuity of the decorative film and the external surface of the tube 14 is observed. As the thickness of the label 12 is small compared to the thickness of the tubular body 13, the edges 18 and 18' are imperceptible. This embodiment is particularly beneficial for providing a 360° decoration or ensuring the continuity of barrier properties when the barrier layer is carried by the label 12. This second embodiment may necessitate means for lateral cutting of the label 12 situated upstream of the swan-neck 20. These cutting means enable accurate adjustment of the width of the decorative film to obtain the end-to-end positioning shown in FIG. 9.

Another embodiment of the invention consists in forming an overlap between the edges 18 and 18' of the decorative film 12. This embodiment is particularly beneficial when the lower surface of the film 12 can be welded to its upper surface. The overlap is advantageously welded during the step (8) of bringing them into contact and the calibration-cooling step (9). In this preferred embodiment, the overlap is welded thanks to the heat provided by the extruded tubular body 13 in the molten state. An alternative embodiment consists in adding a preheating operation before the step (8) or an operation of welding the overlap before, simultaneously with, or after the step (8).

In order to increase the strength of the tubular body 13 at the level of the edges 18 and 18' of the decorative film, another embodiment of the invention consists in creating an increase in the thickness of the tubular body 13 at the location of the junction of the edges of the film. This local increase in the thickness of the tube enables a homogeneous strength of the tube to be obtained over its circumference.

Another embodiment of the invention consists in adding a reinforcing strip between the decorative film 12 and the tubular body 13 that connects the edges of the decorative film. The reinforce strip is advantageously welded thanks to the heat provided by the tubular body 13 in the molten state. If necessary a preheating operation or a welding operation may be added to fix the reinforcing strip to the internal face of the film 12.

The extruded or co-extruded tubular body 13 is generally made up of a thermoplastic resin from the family of polyolefins (for example linear low-density polyethylene, low-density polyethylene, high-density polyethylene, mixtures of polyethylene, polypropylene), but the invention is not limited to use of the resins described above. For example, the multilayer structure with an ethylene vinyl alcohol resin as oxygen barrier and a polyolefin resin is routinely used to improve the barrier performance of the packaging. The tubular body 13 represents at least 70% of the thickness of the tube 14 and preferably at least 80% of the thickness of the tube 14.

The label 12 forms at least part of the external surface of the tube 14. This decorative film enables for example identification of the packaged product and the manufacturer, provides decoration, etc. In the preferred embodiment, the decorative film is thin. It is preferably a multilayer film and may be made of a great variety of materials including paper, aluminum and plastic materials. The support film may equally be made up in part of a textile film to provide specific sensory properties. The decorative film 12 comprises at least one layer (namely its internal layer) which through the effect of the heat provided by the tubular body 13 enables adhesion of the decorative film to said extruded tubular body 13. The multilayer structure may comprise for example layers of polyethylene, polypropylene, polyethylene terephthalate, polyamide, ethylene vinyl alcohol, paper, aluminum, metallization layers or layers of silicon oxide, adhesive layers, etc. The thickness of the decorative film is preferably between 5 and 100 microns inclusive, and advantageously between 10 and 50 microns inclusive.

Specific properties of the decorative film are necessary for use of the method and are described below. In the step (8) of the method shown in FIG. 1, the extruded body 13 is brought into contact with the internal surface of the decorative film 12. Once contact has been established, the extruded body 13 in the molten state transmits some of its thermal energy to the decorative film during the calibration step (9), which has the effect of welding the film to the extrudate 13. A multilayer decorative film is preferably used to prevent the film from being degraded by the effect of the heat provided by the extrudate. The multilayer structure of the film enables combination of a first layer that will at least partially melt in contact with the extruded body 13 and a second layer the melting point of which is at least 20° C. and preferably 40° C. higher than that of said first layer so that the second layer will not be affected by the thermal energy of the extruded body 13.

The thermal properties of the second layer notably make it possible to prevent significant shrinkage of the film because of the effect of the heat provided by the extrudate. Indeed, sizeable shrinkage of the film would have a negative effect not only on the decoration but also on the homogeneity of the thickness of the tube. It has been determined experimentally that less than 5% shrinkage of the film is necessary to obtain packaging of quality. This shrinkage is preferably less than 2%.

The decorative film is also loaded in traction during use of the method and primarily during the steps (6) and (8) to (12) of the method. In the step (6) the shaping of the film with the tubular geometry generates friction between the film and the tools. In the steps (8) and (9), the tubular body 13, which is still mostly in the molten state, is driven by the decorative film. The traction force on the decorative film is between 10 N and 100 N inclusive and depends on the friction between the film and the tools and on the diameter of the tube. This traction force generates high stresses in the film, which is generally thin.

The decorative film multilayer structures that conjointly have appropriate thermal and mechanical properties are for example structures including a bioriented polymer layer of the PET, PP or PA type.

The decorative film must therefore have at the same time thermal properties and mechanical properties conferring upon it a dimensional stability when the film is heated by the extrudate and tensioned by the axial traction force applied during the method.

In a preferred embodiment of the invention the label 12 includes in its structure at least one layer the melting point of which is higher than 160° C. and at least one layer of the same kind as the tubular body. The layer that has good thermal stability may be made up for example of bi-oriented polyethylene terephthalate (PET), polyamide (PA), aluminum (Alu) or paper. For a polyethylene tubular body, these are examples of decorative film structure: PET/PE, PE/PET/PE, PA/PE, Alu/PE, PE/Alu/PE, Paper/PET/PE.

The label 12 may be printed by all known flat printing methods such as for example flexography, screen printing, heliogravure, typographic printing, offset printing, hot stamping, cold foil, or again digital printing and combinations of these printing technologies. The invention will advantageously be associated with digital printing for productions necessitating flexibility and rapid change of decoration. The printing is generally covered with a protective varnish also providing matt or gloss effects for example. The choice of the varnish is important, especially its coefficient of friction in the shaping and calibration tools.

The invention may advantageously be associated with digital online printing of the label 12. In this instance, the roll 19 of decorative film shown in FIG. 2 is replaced by a digital printing machine operating in a synchronized manner with the extrusion-labeling line. According to a variant of this configuration, one or more on-line complexing operations may also be effected before the extrusion-decoration process. For example a complexing operation is necessary when it is required that the printing is trapped within the thickness of the decorative film 12. One possible configuration making it possible to have the printed layer trapped results form the succession of the following steps:

- unrolling a non-decorated first film,
- digital printing of the first film,
- complexing of a second film on the first film in order to trap the printing—obtaining of the decorative film,
- lateral cutting of the edges of the decorative film,
- execution of the extrusion-decoration method in accordance with the principles of the invention.

The decorative film 12 may be printed recto or verso so that the printing is on the surface of the tube 14 or trapped within the thickness of the tube. Printing is advantageous for producing complex decoration at lower cost because the decoration operation is carried out flat on a thin film.

The invention is particularly advantageous for producing at lower cost tubes with a top of the range decoration.

The invention is particularly advantageous for enhancing the sensory properties of the tubes by providing with the decorative film a surface layer having a particular "touch". These properties are provided for example by a matt bi-oriented polypropylene film or a textile film.

The invention is particularly advantageous because it enables modification of the functionality of the packaging by changing the decorative film. These functionalities may be of an esthetic order (decoration), sensory order (touch), technical order (barrier properties) or informational order (communication on the packaging).

The invention is particularly advantageous because the decorative film forms an integral part of the packaging. It is integrated into its structure and contributes to its properties.

The invention is not limited to the production of the few examples of multilayer structures cited in the text. It is obvious to the person skilled in the art that the invention makes it possible to increase the number of structures that can be produced and to combine very different materials (plastic, paper, aluminum, etc.).

The invention enables by default production of tubular bodies without decoration but including a surface film. This variant may be more specifically used to improve the mechanical, barrier or sensory (touch) properties of the tubes.

The invention may also be used in the field of packaging, primarily to provide a decoration but also in technical fields for improving the mechanical or barrier properties. An advantageous embodiment of the invention provides the barrier and the decoration by means of the film. The multilayer film that provides the barrier and the decoration is combined with a single-layer extruded body, which enables simplification of the extrusion device.

For extrusion of difficult products, the invention may be used to reduce production costs by increasing production speed.

A first variant of the invention leads to the succession of the following operations carried out utilizing the principles of the invention described above:

- production by welding of a first tubular body from a multilayer film,
- extrusion of a second tubular body in the molten state onto said first tubular body,
- conjointly, deposition of the label on the external surface of the second tubular body in accordance with the method of the invention.

A second variant of the invention consists in trapping the label in the wall of the tube. The following operations are used for this:

- extrusion of a first tubular body in the molten state,
- conjointly, deposition of the label on the external face of the first tubular body by the method of the invention,
- thereafter, extrusion of a second tubular body and deposition of said second tubular body in the molten state on the external face of the label.

The label used in the second variant preferably includes three layers. The surface layers of the film enable welding to the extruded layers and the trapped third layer provides the thermal and mechanical properties.

The second tubular body in the molten state is preferably deposited on the external face of the label when the first tubular body is at least partly cooled.

A third variant of the invention consists in adding a film to the external surface of an extruded tubular body and including expansion agents. The following method is used:

extrusion of the tubular body in the molten state from a resin including expansion agents, disposition of the film around the tubular body using a swan-neck shaper, bringing the external surface of the tubular body into contact with the internal face or internal layer of the film thanks to the conjugate action of the expansion agents and the jet of air, calibration of the tubular body and cooling.

The expansion agents used may be physical or chemical expansion agents. The physical expansion agents mixed with the polymer are for example carbon dioxide gas or nitrogen the change of state of which (liquid to gas) creates the expansion of the polymer in the molten state. The chemical expansion agents may be azodicarbonamide or azobis formamide. The advantage of the invention for the production of expanded tubular or cylindrical bodies is the combination of the surface and decoration properties provided by the film and the weight reduction properties provided at heart by the expansion agents.

The embodiments of the invention are provided by way of illustrative example and must not be considered as limiting on the invention. They may be combined with one another or call upon equivalent means depending on circumstances within the context of the present invention.

REFERENCE NUMBERS

12 Decorative film or label
13 Extruded body
14 Tube
15 Drive roller
16 Tensioning arm
17 Drive caterpillar track
18 Edges of the film
19 Spool of film
20 Shaper (swan-neck)
21 Vacuum and cooling tank
22 Calibration element
23 Extruder
24 Extrusion head
25 Gap between the edges of the film
26 Magnetic plug
27 Extrusion nozzle
28 Blower rod
29 Starting plug
30 Blower slot
31 Washers
32 Escape channel
33 Circumferential cutter
34 Decorated tube segment
35 Shape defect
36 Jet of air
37 Magnets
38 Direction of movement
39 Magnetic bush

The invention claimed is:

1. A method of extruding and labeling a packaging tube by an extrusion-labeling line comprising the steps of:

(a) forming a partially or totally tubular label from a film in a shaper;

(b) introducing the tubular label into a calibration element;

(c) extruding a tubular body on a side of a concave face of the tubular label [in] *from* an extrusion head; and (d) bringing an external face of the extruded tubular body into contact with the concave face of the tubular label to produce a labelled packaging tube, by creating a first pressure difference between an interior and the external face of the extruded tubular body by an air jet, the first pressure difference generated by a first floating plug arranged downstream of the shaper [that] , *wherein the first floating plug* at least partially obstructs an escape of air via the interior of the tubular body, *wherein* the first floating plug *is* not mechanically attached along a direction of a movement of the extrusion, and [being] *wherein the first floating plug is* at a fixed position where the extruded tubular body is solidified, and *wherein the first floating plug is* retained at said *fixed* position by a magnetic force while the extruded tubular body is moved downstream past the first floating plug.

2. The method as claimed in claim 1, wherein the first pressure difference is also generated by a controlled escape of air from an upstream side of the shaper via the extrusion head.

3. The method as claimed in claim 1, wherein the first floating plug is located after a device for pulling on the packaging tube.

4. The method as claimed in claim 3, wherein the first pressure difference facilitates a pulling of the packaging tube performed by the device for pulling.

5. The method as claimed in claim 1, wherein a second plug is connected to the extrusion head during a starting phase.

6. The method as claimed in claim 5, wherein in the starting phase, the second plug is released from the extrusion head and transported by the moving of the packaging tube until the second plug abuts against the first floating plug.

7. The method as claimed in claim 5, wherein the second plug is movable along the direction of the movement.

8. The method as claimed in claim 1, wherein a second pressure difference is established between the interior and the exterior of the packaging tube, the second pressure difference created by a reduced pressure in a vacuum tank.

9. The method as claimed in claim 1, wherein step (c) is performed in the calibration element.

10. The method as claimed in claim 1, wherein the calibration element is cooled.

11. The method as claimed in claim 1, wherein the calibration element includes a contact surface that enables reduction of friction with the tubular label.

12. The method as claimed in claim 1, further comprising the step of:

controlling a tension of the tubular label at an entry of the shaper.

13. The method as claimed in claim 1, wherein the tube undergoes a treatment to optimize roundness.

14. The method as claimed in claim 1, wherein edges of the tubular label are disposed end to end or edges of the tubular label overlap.

15. The method [of] as claimed in claim 1, wherein the tubular label includes two layers, one of the layers has a melting point that is at least 20° C. higher than a melting point of the extruded tubular body.

16. The method [of] as claimed in claim 1, wherein a magnetic sleeve is arranged to provide for the magnetic force to the first floating plug, the magnetic sleeve arranged around the extruded tubular body.

17. The method [of] as claimed in claim 1, wherein the tubular body is extruded by an extrusion nozzle of the extrusion head, and the air jet is provided by a blower slot of the blower rod and [and] is escaping via an escape channel situated between the extrusion nozzle and blower rod.

* * * * *